United States Patent [19]

Latter et al.

[11] 4,216,745
[45] Aug. 12, 1980

[54] UNTHROTTLED LEAN MIXTURE GASOLINE ENGINE

[75] Inventors: Albert L. Latter, Marina del Rey; R. Philip Hammond; James L. Dooley, both of Santa Monica, all of Calif.

[73] Assignee: R & D Associates, Marina del Rey, Calif.

[21] Appl. No.: 949,764

[22] Filed: Oct. 10, 1978

[51] Int. Cl.² .................. F02B 3/02; F02B 23/10; F02F 1/24
[52] U.S. Cl. ............................ 123/26; 92/171; 123/403; 123/432; 123/443; 123/299; 123/668; 123/193 C
[58] Field of Search .............. 123/1 A, 32 F, 32 G, 123/26, 32 ST, 41.56, 41.67, 191 A, 193 C, 193 CH, 193 CP, 148 E, 108, 75 B, 32 SP; 92/170, 171; 138/42

[56] References Cited

U.S. PATENT DOCUMENTS

| 2,195,709 | 4/1940 | Sanders | 123/32 F |
|---|---|---|---|
| 2,751,285 | 6/1956 | Bartleson | 123/1 A |
| 3,092,089 | 6/1963 | Dolza | 123/26 |
| 3,422,803 | 1/1969 | Stivender | 123/108 |
| 3,776,212 | 12/1973 | Karlowitz | 123/32 ST |
| 4,011,839 | 3/1977 | Pfefferle | 123/191 A |

FOREIGN PATENT DOCUMENTS 241494 10/1925 United Kingdom .................. 123/32 F

OTHER PUBLICATIONS

Taylor; "The Internal Combustion Engine In Theory And Practice"; copyright 1966; vol. 1, p. 446.
Society Of Automotive Engineers; "Stratified Charge Mixing Strategies Compared"; 8/1978 Issue Automotive Engineering, vol. 86, No. 8, pp. 68-75.

Primary Examiner—Charles J. Myhre
Assistant Examiner—Craig R. Feinberg
Attorney, Agent, or Firm—Poms, Smith, Lande & Rose

[57] ABSTRACT

A gasoline internal combustion engine is operated at all times with a full charge of air and is thus unthrottled. At low power levels for such an engine, the ratio of gasoline to air is too lean for normal combustion; therefore, special arrangements are provided by this invention for ensuring combustion. These special arrangements, which may be used together, singly, or in any combination, include (1) the formation of droplets of gasoline within the cylinder, with each gasoline droplet having around it a zone that is within the combustible range, and the provision of a spark that will ignite the combustible zone around at least a few droplets and will then propagate to other droplets; (2) the provision of a series of compartments separated by partitions at the top of a cylinder and supplying a combustible charge and ignition to a variable number of the compartments, depending on the power desired; (3) the use of either or other similar ignition-enhancing material to cause combustion despite a very lean mixture. Another feature of the invention improves the efficiency of the above provisions by maintaining the walls of the cylinder cool by employing porous walls and air at high pressure filtering through the walls into the piston chamber.

6 Claims, 7 Drawing Figures

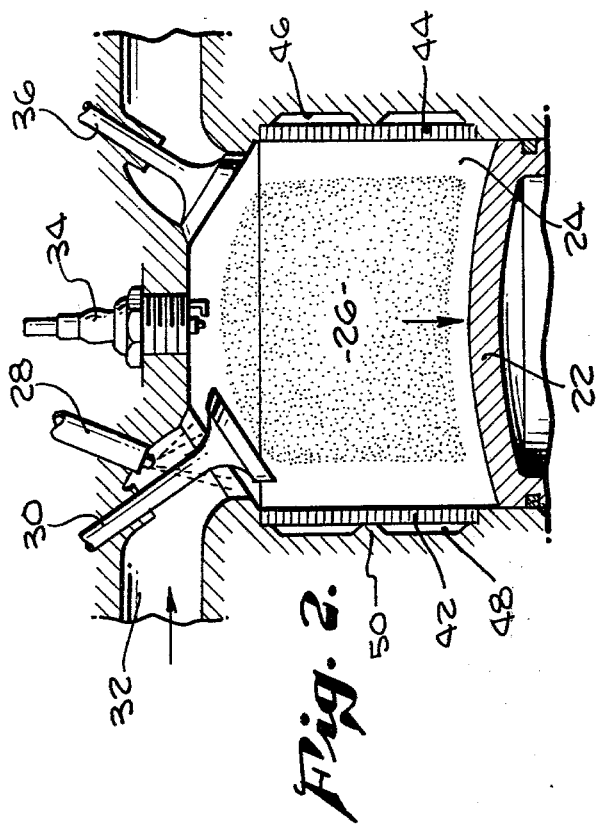
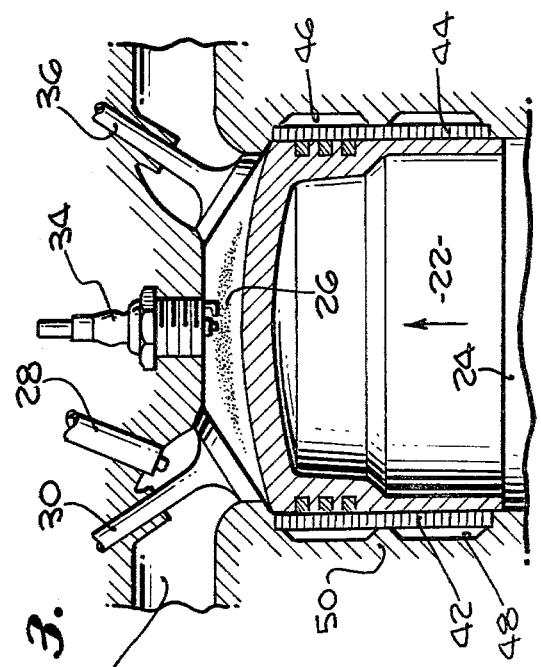
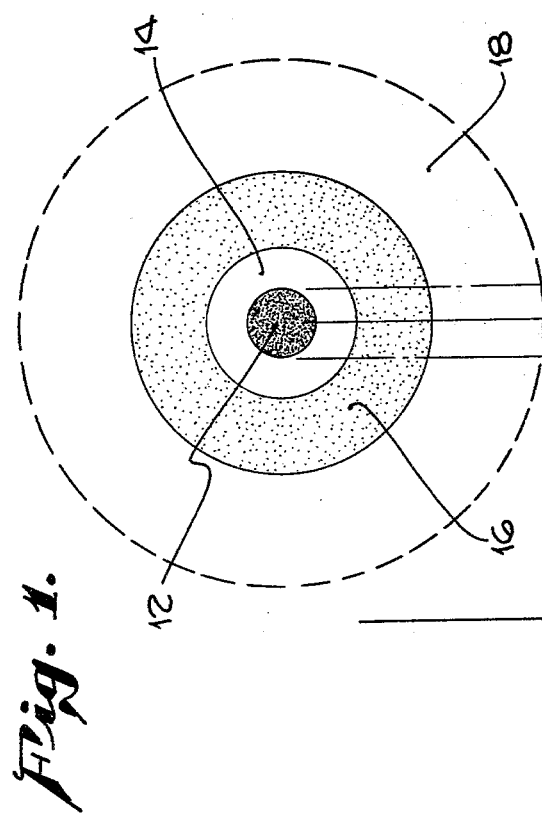
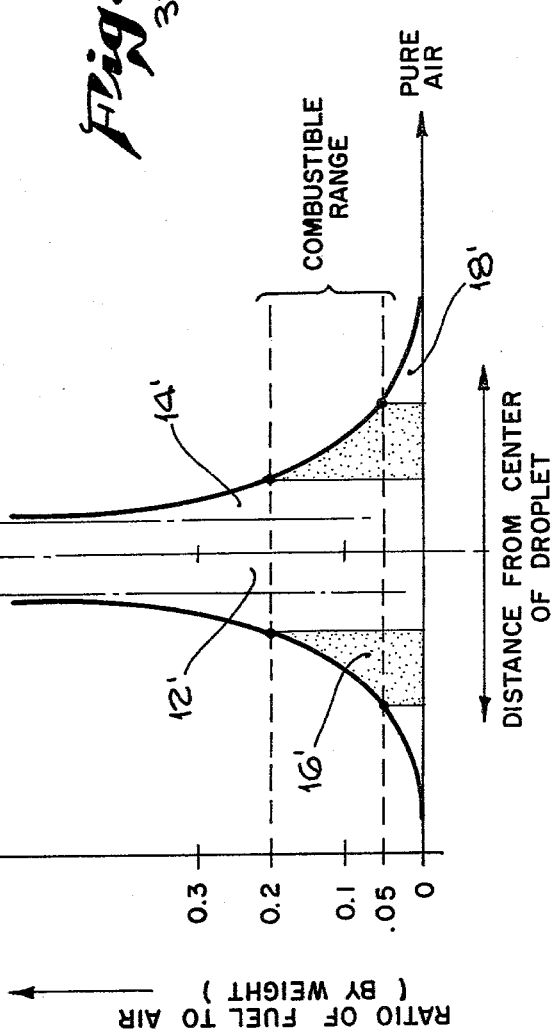

UNTHROTTLED LEAN MIXTURE GASOLINE ENGINE

FIELD OF THE INVENTION

This invention relates to unthrottled gasoline engines which operate on lean gasoline-air mixtures to ensure high efficiency at less than full power output.

BACKGROUND OF THE INVENTION

In order to provide adequate power in the normal automobile for acceleration and grade ascension under heavily loaded conditions and at all altitudes and temperatures, the internal combustion engine which is provided is much larger than is necessary for most driving conditions. For example, most automobiles average about 30 miles per hour speed over their entire lifetime, at which speed only about 5% of the maximum available power is required. On the other hand, this same vehicle averages about three stops for every mile driven, so the higher start and acceleration power is needed.

It has been know to those experienced in the field of internal combustion engines, that a significant loss of efficiency occurs when the full air and fuel charge is burned under conditions where serious heat losses to the relatively cool cylinder walls occur. It is also well known that satisfactory ignition and burning of the fuel-air mixture occurs only within certain definite mixture ratio and limits, and that for air and gasoline this ratio is from about 5:1 to about 20:1, on a weight basis. Further, to a first order of approximation, this ratio is independent of the pressure of the gas. In present engines, engine power is reduced by reducing the inlet charge density, or the pressure, while keeping the mixture ratio combustible, within the limits noted above. This inlet "throttling" causes the engine cylinders to intake air below atmospheric pressure and to discharge it at full atmospheric pressure, thereby incurring a "pumping loss." This is a serious cause of inefficiency except under full load conditions.

Classic analysis of engine thermodynamics also indicates that heat loss out the exhaust can be minimized when the peak combustion temperatures are kept relatively low.

To eliminate the "pumping loss" inherent in throttling action when air is taken in to the cylinders at less than atmospheric pressure, and to reduce the combustion heat losses to the cylinder walls at less than maximum power output, many efforts have been made in the past to operate an engine such that a full air charge is used each cycle (thereby minimizing the pumping losses by taking air into the cylinder at atmospheric pressure) with the reduced fuel quantity inserted into the air charge so as to mix with only a portion of it, to locally maintain a suitable mixture ratio. The so-called "stratified charge" engines represent one of the efforts along these lines.

To date, these types of engines have not been entirely successful because ignition is not assured over the widely varying conditions encountered in an automobile engine, and in view of other problems. In general, the exhaust emissions characteristics of such engines are as good or better than conventional engines and the fuel economy is markedly better, but their "drivability," or the engines ability to operate a vehicle under widely varying load and speed conditions, is unacceptable.

Objects of the present invention therefore include the following for an engine under less than full power: (1) the reduction of heat lost to the combustion chamber walls, including the sidewalls and the top of the cylinder; (2) reduction or elimination of "pumping load" losses resulting from the throttling action in conventional internal combustion engines; (3) lowering the heat lost to the exhaust by maintaining low peak gas temperatures.

SUMMARY OF THE INVENTION

The various structural features described hereinbelow will all involve "unthrottled" engines in which a full charge of air is taken into the cylinder. It should be noted in passing that the word "throttle" has, in connection with automobile engines, come to mean varying the amount of fuel applied to the engine; but in the present application the designation "throttle" will be limited to its original concept of reduction of the pressure of the air and gasoline vapor, supplied to the cylinders of the engine. In addition, the present invention is limited to engines in which the overall ratio of air to fuel is more than 20:1 at low power levels. This is of course leaner than the ratio required for ignition, and well below the stoichiometric ratio for complete combustion, which is about 15:1.

With the foregoing background, the present invention involves in one aspect the applying of the gasoline in fine liquid droplet form, so that, spaced out from the center of the droplets are regions within the critical combustible range. Thus, although the overall ratio of fuel to air might be far too low to permit combustion, the higher concentration zones adjacent the droplets will permit the ignition of certain few droplets adjacent the spark gap, and this will cause propagation of ignition throughout the chamber and proper lean burning of the entire charge. The spark is sufficient in length and intensity to ignite several of the droplet-associated combustible zones and thus initiate timely ignition; and to ensure such operation, the spark gap may be somewhat longer, and the applied electrical pulse somewhat more intense and of higher voltage than that employed in present internal combustion engines.

Another closely related technique, in accordance with the present invention involves the provision of compartments separated by partitions within the combustion chamber and arranged to avoid piston interference at top travel. With a substantial number, such as six to ten separate small pockets or compartments, under light load conditions, fuel is injected or supplied only to the central few compartments, and the remainder are filled only with air. Under these conditions, the higher concentration of gas in the few compartments to which gas is supplied permits their ignition, while the outer compartments are inactive.

In accordance with another aspect of the invention, ether or another volatile, ignition-enhancing substance may be supplied with the gasoline under light load conditions, so that the resultant gasoline, air, and ether combination will ignite despite a ratio of gasoline to air which is much leaner than that which is normally required for combustion.

In accordance with still another feature of the invention, the cylinder walls may be porous, and may be provided with high pressure ring-shaped chambers enclosing the pistons so that cool air will transpire into the cylinders and reduce the transfer of heat from the combustion gas into the cylinder walls.

The various features described hereinabove may be used by themselves or in cooperation with one or more of the other features to achieve the desired result of increased efficiency and economy in the operation of automobile internal combustion engines.

Other objects, features, and advantages of the invention will become apparent from a consideration of the following detailed description and from the accompanying drawings.

BRIEF DESCRIPTION OF THE DRAWINGS

FIG. 1 is a diagram of a gasoline droplet, indicating the combustion zone which surrounds each droplet;

FIGS. 2 and 3 are diagrams of the piston and combustion chamber of an internal combustion engine in which droplets of the type shown in FIG. 1 are employed;

DETAILED DESCRIPTION

Figure 4:
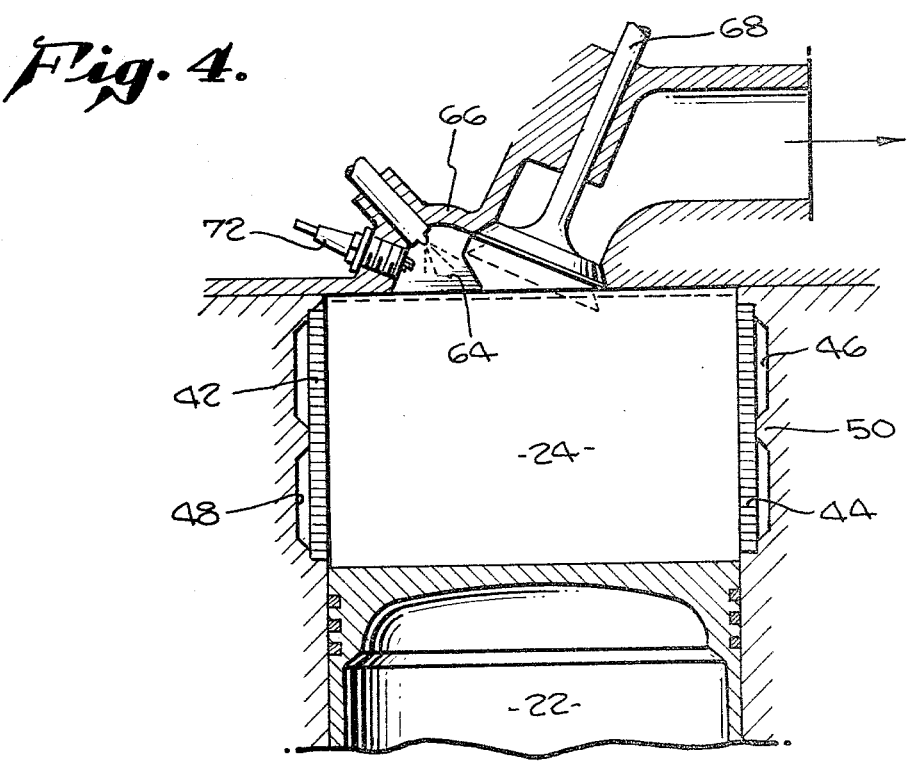
FIGS. 4 and 5 are two cross-sectional views showing an alternative form of piston and compartmentalized ignition arrangement.

Referring more particularly to the drawings, FIG. 1 is a diagram showing in the upper portion a droplet of gasoline 12, and in the lower portion a graph of the ratio of fuel to air plotted against the distance from the center of the droplet. In FIG. 1 the center portion 12 of the droplet is the remaining portion of the droplet which is entirely liquid. Additional zones or spherical shells around the droplet 12 include the region 14 which has a very high ratio of fuel to air, the region 16 which is in the combustible range with a ratio of fuel to air of about 0.2 or 1:5 up to about 0.05, or 1:20. The outer ring or spherical shell 18 is the zone where the ratio of fuel to air is less than about 0.05 so that it would normally be not combustible. In the lower plot portion of FIG. 1, the regions are designated by the reference numbers 12', 14', 16', and 18', corresponding to the similar regions in the droplet diagram portion of FIG. 1. The precise configuration of the droplet zones will depend on a number of factors, including the size of the droplet, the time after the formation of the droplet, and the atmospheric pressure and temperature conditions under which the evaporative regions are being formed.

FIGS. 2 and 3 are cross-sectional views of one cylinder and piston of an internal combustion engine operating in an unthrottled lean burn mode, with FIG. 2 showing the cylinder and piston at the end of the intake stroke and FIG. 3 showing the cylinder and piston in the firing position. In FIG. 2, the piston 22 in the course of its downward stroke within the cylinder 24 has drawn droplets of gasoline 26 provided by the fuel injector 28 in through the intake valve 30. Unthrottled air is also supplied through the inlet 32. A sparkplug 34 is located at the top of the cylinder, and an exhaust valve 36, which is closed, is also located at the top of the cylinder.

By the time the piston 22 has reached the firing position, as shown in FIG. 3, the inlet valve 30 has been closed, and the fuel has evaporated to a considerable extent and has reached the state shown in FIG. 1 with a large number of combustion "centers," such as those shown at 16 in FIG. 1.

In order to ensure ignition, the spark gap of the sparkplug 34 may be somewhat larger than that employed in conventional internal combustion engines. Thus, for example, a conventional engine normally uses a spark gap of 0.025 to 0.030 inch. In order to ensure combustion, it is contemplated that a spark gap of 0.040 to 0.050 may be employed. Also, in conventional ignition systems, sparks in the order of 10,000 up to about 30,000 volts are employed; in the present arrangements, it is contemplated that higher voltages, commensurate with the greater spark gap, should be employed, with voltages running in the order of 20,000 to about 60,000 volts being the proper order of magnitude.

Figure 6:
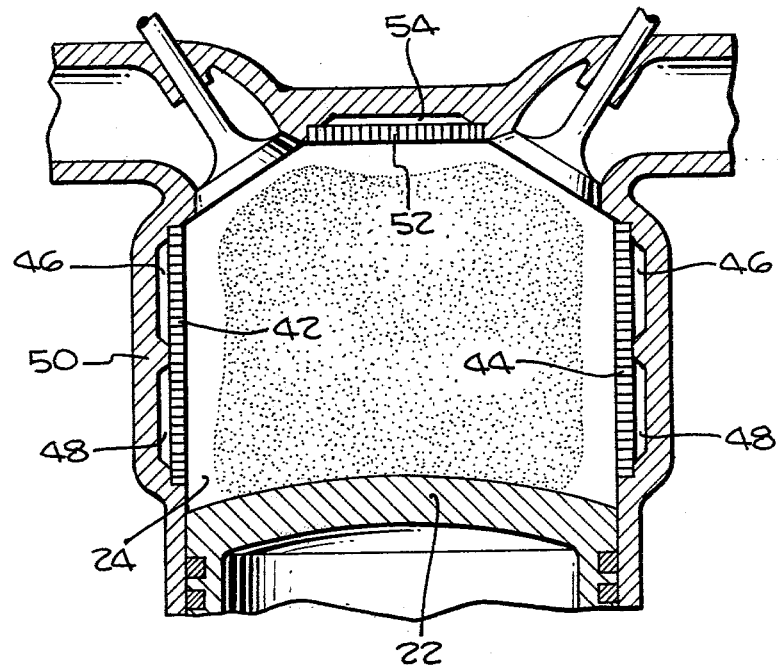
FIG. 6 is a diagram showing arrangements for isolating combustible charge from the cylinder walls of an internal combustion engine.

Around the exterior of the cylinder 24, porous liners 42 and 44 may be provided, and these separate the space 24 within the cylinder from the air pressure chambers 46 and 48 that are located within the cast iron engine wall 50. In addition, although not shown in FIGS. 2 and 3, the top wall of the combustion chamber adjacent the sparkplug 34 may also be provided with a porous liner 52, as better shown in FIG. 6 of the drawings. With regard to the pressures in the chambers behind the porous liners, including the chamber 54 behind the porous liner 52, they should be maintained at a pressure sufficiently high that a small volume of air will seep through from the chambers into the combustion cylinder. With the maximum pressure in the cylinder occurring at the top prior to significant downward movement of the piston in the compression stroke, and with this pressure being in the order of 500 to 600 pounds per square inch, the space 54 behind porous liner 52 is pressurized to a pressure slightly above the maximum pressure expected within the cylinder. As the piston 22 goes down, the pressure within the cylinder is reduced, so the pressure in the ring-shaped chambers 46 may be progressively less than that in the chamber 54, with the precise pressures in the chambers 46 and 48, depending on the pressure characteristics of the engine employing the liners 42 and 44. More than two annular chambers may be used with the pressure being scaled down progressively.

Incidentally, the liners 44 may be made of porous cast iron material, for example, suitably etched to provide a small amount of uniform seepage through the walls. Alternatively, sintered metal liners suitable processed on their inner surfaces to provide a relatively smooth surface facing the piston and the piston rings, could be employed.

Figure 5:
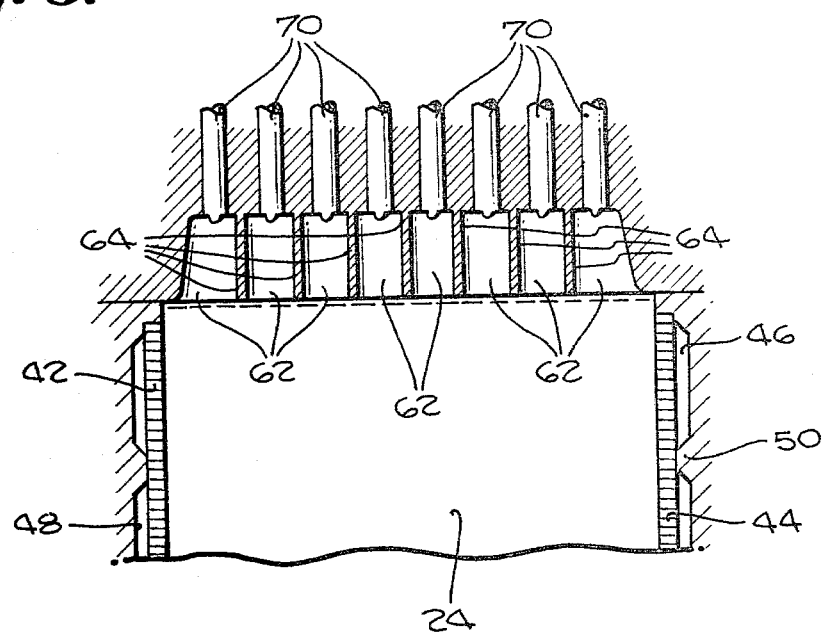

Now, referring to the embodiment of FIGS. 4 and 5, the top of the cylinder 24 may be provided with a series of combustion chambers 62 separated by partitions 64 that extend downwardly from the top 66 of the combustion chamber above the cylinder 24. Incidentally, the inlet and exhaust valves are mounted side by side in the position shown at 68 in FIG. 4 in the portion of the chamber to one side of the partitions 64. In addition, a plurality of individual fuel injectors 70 are provided, with one for each of the pockets or compartments 62. Furthermore, sparkplugs 72 may be provided for each compartment.

Under light load conditions, only a few, such as four of the centrally located pockets or compartments are powered in order to provide cruise power. With substantial isolation of the pockets from one another, it is quite practical to have a combustible mixture in a few of the central pockets, while supplying no fuel to the outer pockets. This has the collateral advantage of avoiding undue losses to the cylinder walls that, as mentioned above, cuts down efficiency. As more power is required, additional ones of the fuel injectors 70 are operated to supply fuel to additional compartments, and under full load conditions, a full charge of fuel is supplied at a ratio in the order of about 16:1, beyond stoichiometric ratio to still ensure full burning of the charge.

If desired, the droplets as supplied to the individual compartments may be formed as indicated in FIG. 1, so that evaporation-caused zones of combustibility are present in each of the compartments.

The walls of the small compartments may be quite hot, so that immediate ignition may occur when fuel is injected into them. Accordingly, when high heat conditions obtain in the small chambers, proper injection timing is mandatory, but pre-ignition and detonation is not a serious problem since the individual combustion chambers are so very small.

To supplement the embodiments shown in FIGS. 2 through 6 of the drawings, a chemical additive may be employed to broaden the ignitability limits on the lean side of the stoichiometric ratio that, as mentioned above, is about 15:1. When such an additive is employed, combustion under part-load engine output conditions can be obtained even under very lean conditions. Various chemical substances may be employed, with one preferred substance being ether in any one of a number of its forms including dimethyl, diethyl, ethylmethyl, isopropyl, or butyl, for example. While it is recognized that ether has been added to gasoline for racing car performance with normal gasoline and air ratios, the present suggestion is to use ether or other suitable chemicals for the ultra lean conditions where ignition would otherwise not be possible. Further, in cases where full output or even moderate output of engine power is desired, the chemical additive may be dropped, or dispensed with.

Figure 7:
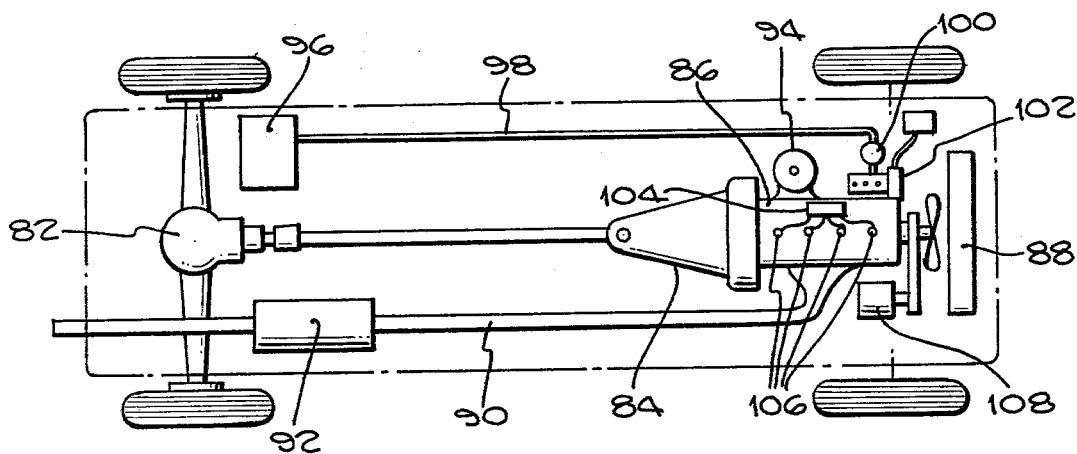
FIG. 7 is a diagrammatic showing of an automobile equipped with a lean burn engine.

For completeness, FIG. 7 is a diagrammatic view of a typical internal combustion engine, employing the principles of the present invention. The car includes conventional tires, a differential 82, the transmission 84, and the engine 86. Other conventional equipment includes the radiator 88, the exhaust manifold and tailpipe 90, and the muffler 92. The unthrottled air intake and air filter is designated by the reference numeral 94. The fuel tank 96 is coupled by the fuel line 98 to the fuel pump 100, and to the fuel injection and spray control unit 102. A high voltage ignition system 104 supplies sparking energy to the plugs 106. In addition, an air compressor 108, powered from the fanbelt, may be employed to supply high pressure air to the chambers 46, 48, and 54, as shown in several of the figures of the drawings.

Concerning the amount of fuel that is employed in the embodiment of FIGS. 2 and 3 of the drawings, it is again mentioned that the stoichiometric mixture ratio for full combustion is about 1:15 for fuel to air by weight, and at full engine power the entire charge should be substantially of this mixture. Under typical light load conditions, the theoretical mixture ratio, with no reduction in air charge density, or no throttling, could be 1:135 if the gasoline vapor were uniformly distributed, that is of course well beyond the combustibility limit of 1:20. Now, considering the situation where small droplets are employed, and a few of these are initially ignited by the spark. Each small combustion center is near stoichiometric fuel to air proportions when it burns, so it must raise the temperature of 8 times as much air to the ignition temperature to ignite an adjacent "fuel center." One gram of fuel releases $4.6 \times 10^{11}$ ergs of energy when burned in air. For operability, this amount of energy must raise the temperature of 135 grams of air from the compression temperature to the ignition temperature, which is approximately 200° C. under the poor or lean mixture conditions indicated above.

In calculating the temperature rise, it is proportional to the energy released from the fuel, and inversely proportional to the product of the weight of air multiplied by the specific heat of air. With the specific heat of air being equal to approximately $1.05 \times 10^7$ ergs per gram per degree C., the temperature rise is approximately 325°. Accordingly, even under light load conditions, there is adequate energy in the cylinder to cause flame propagation following ignition.

With the total amount of fuel to be injected being determined as indicated above, the proper droplet size for different operating conditions may be established by varying a number of factors relative to the fuel injection nozzles. Specifically, the injection pressure, the injection rate, the injection hole size and shape, and the injection hole aspect ratio may all be varied, in addition to varying the number of injection holes. In addition, when pintletype nozzles are employed, the needle lift and lift rate may also be controlled.

Incidentally, for completeness and for support of the statements made herein relative to the normal operation of automobile internal combustion engines at very low operating loads, reference is made to page 446, FIGS. 12-16, of a text entitled, "The Internal Combustion Engine in Theory and Practice," by C. Fayette Taylor, Vol. I, second edition, Copyright 1960 and 1966, M.I.T. Press, Cambridge, Mass. In addition, reference is made to an article entitled, "Stratified Charge Mixing Strategies Compared," which appeared at pages 68–75 of the August, 1978 issue of Automotive Engineering, Volume 86, No. 8. This article discusses prior proposed lean burning internal combustion engines.

It is also noted that in connection with the embodiment of FIGS. 4 and 5 in which partitions and combustion chamber compartmentalization is employed, the gasoline may be either in vapor or droplet form, and is injected late in the compression cycle, as the piston nears its upper position, to avoid undue dispersion of the ignitable mixture.

It is to be understood that the foregoing detailed description merely relates to certain specific embodiments of the invention. Other embodiments and alternatives employing substantially unthrottled air input and very lean ratios of fuel to air are within the scope of the present invention.

What is claimed is:

1. An automotive engine of the internal combustion type having respective pistons and cylinders wherein the improvements include:
    means for supplying air to the pistons at a pressure at least equal to atmospheric pressure throughout the power operating range of said engine;
    means for providing a ratio of less than 1:20 of gasoline to air in the low power operating range of said engine;
    means for supplying droplets of gasoline substantially uniformly distributed throughout selected defined regions of the volume of each of the combustion chambers of said engine, whereby despite an overall sub-ignition ratio of gasoline to air, small local ignitable zones surround each of said droplets; and means for providing a vigorous spark extending through a predetermined volume in said cylinder to ignite at least one of said ignitable zones, thereby initiating combustion throughout said lean mixture of gasoline and air; whereby the ratio of fuel to air and the resultant temperature and energy losses are all reduced in the low power operating range of said engine; and further comprising means for reducing heat loss to the cylinder walls of said engine, said means including porous cylinder walls extending around the curved peripheral surfaces of said cylinders, and means for supplying air under high pressure to the outer surface of said porous walls.

2. An automotive engine as defined in claim 1 wherein partition means are provided for separating the defined regions in said combustion chambers, and means are provided for supplying fuel separately to each of the defined regions which are separated by said partitions.

3. An automotive engine as defined in claim 2 wherein said partitions separate and define combustion regions which are at different spacings from the cylinder walls, and means are provided for supplying fuel only to the regions spaced further away from the wall during light load operating conditions, and to additional regions under greater load conditions.

4. An automotive engine of the internal combustion type having respective pistons and cylinders wherein the improvements include:
  means for supplying air to the pistons at a pressure at least equal to atmospheric pressure throughout the power operating range of said engine;
  means for providing a ratio of less than 1:20 of gasoline to air in the low power operating range of said engine;
  means for supplying droplets of gasoline substantially uniformly distributed throughout the greater portion of the volume of each of the cylinders of said engine, whereby despite an overall sub-ignition ratio of gasoline to air, small local ignitable zones surround each of said droplets; and
  means for providing a vigorous spark extending through a predetermined volume in said cylinder to ignite at least one of said ignitable zones, thereby initiating combustion throughout said lean mixture of gasoline and air; whereby the ratio of fuel to air and the resultant temperature and energy losses are all reduced in the low power operating range of said engine; and further comprising means for reducing heat loss to the cylinder walls of said engine, said means including porous cylinder walls extending around the curved peripheral surfaces of said cylinders, and means for supplying air under high pressure to the outer surface of said porous walls.

5. An automotive engine of the internal combustion type having respective pistons and cylinders wherein the improvements include:
  means for supplying air to the pistons at a pressure at least equal to atmospheric pressure throughout the power operating range of said engine;
  means for providing an overall ratio of less than 1:20 of gasoline to air in the low power operating range of said engine;
  means for physically compartmentalizing the space above piston travel at top dead center in the combustion chambers of said engine; and
  means for supplying gasoline selectively to a varying number of the compartments with a combustible ratio of gasoline to air in each compartment, whereby despite an overall sub-ignition ratio of gasoline to air in the cylinders under light load conditions, ignition will occur in each compartment to which gasoline has been supplied; whereby the ratio of fuel to air and the resultant temperature and energy losses are all reduced in the low power operating range of said engine; and further comprising means for reducing heat loss to the cylinder walls of said engine, said means including porous cylinder walls extending around the curved peripheral surfaces of said cylinders, and means for supplying air under high pressure to the outer surface of said porous walls.

6. An automotive engine of the internal combustion type having respective pistons and cylinders wherein the improvements include:
  means for supplying air to the pistons at a pressure at least equal to atmospheric pressure throughout the power operating range of said engine;
  means for providing a ratio of less than 1:20 of gasoline to air in the low power operating range of said engine;
  means for physically compartmentalizing the space between the upper operating surface of the piston and the top of the cylinder when the piston is at the end of the compression stroke; and
  means for supplying gasoline selectively to a varying number of the compartments with an ignitable mixture of gasoline and air in each compartment to which gasoline is supplied, whereby despite an overall subignition ratio of gasoline to air in the cylinders under light load conditions, ignition will occur in each compartment to which gasoline has been supplied; and further comprising means for reducing heat loss to the cylinder walls of said engine, said means including porous cylinder walls extending around the curved peripheral surfaces of said cylinders, and means for supplying air under high pressure to the outer surface of said porous walls.

* * * * *